(12) United States Patent
Deng

(10) Patent No.: US 10,135,784 B2
(45) Date of Patent: Nov. 20, 2018

(54) VERIFYING SOURCE ADDRESSES ASSOCIATED WITH A TERMINAL

(71) Applicant: Alibaba Group Holding Limited, George Town (KY)

(72) Inventor: Gaoliang Deng, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 15/243,507

(22) Filed: Aug. 22, 2016

(65) Prior Publication Data

US 2017/0063680 A1    Mar. 2, 2017

(30) Foreign Application Priority Data

Aug. 24, 2015  (CN) .......................... 2015 1 0524597

(51) Int. Cl.
| | |
|---|---|
| *H04L 12/28* | (2006.01) |
| *H04L 29/12* | (2006.01) |
| *H04L 29/06* | (2006.01) |
| *H04W 12/12* | (2009.01) |

(52) U.S. Cl.
CPC ........ *H04L 61/2015* (2013.01); *H04L 61/103* (2013.01); *H04L 63/1466* (2013.01); *H04L 61/6022* (2013.01); *H04W 12/12* (2013.01)

(58) Field of Classification Search
CPC ............... H04L 61/2015; H04L 61/103; H04L 63/1466; H04L 61/6022; H04W 12/12
See application file for complete search history.

(56) References Cited

U.S. PATENT DOCUMENTS

| | | | |
|---|---|---|---|
| 5,790,548 A | 8/1998 | Sistanizadeh et al. | |
| 7,769,994 B2 | 8/2010 | Peles | |
| 7,979,903 B2 | 7/2011 | Kwan | |
| 8,516,243 B2 | 8/2013 | Jokela et al. | |
| 8,533,823 B2* | 9/2013 | Szeto ................. H04L 63/0263 726/22 |
| 8,756,337 B1* | 6/2014 | Canion ................ H04L 63/145 370/237 |
| 2003/0208616 A1 | 11/2003 | Laing et al. | |

(Continued)

OTHER PUBLICATIONS

Bi et al., A SAVI Solution to WLAN, Draft #6, Aug. 7, 2014, pp. 1 to 12.*

(Continued)

*Primary Examiner* — Steve D Agosta
(74) *Attorney, Agent, or Firm* — Van Pelt, Yi & James LLP

(57) ABSTRACT

Verifying source addresses associated with a terminal is disclosed, including: receiving a packet from a terminal, wherein the packet comprises a source Internet Protocol (IP) address and a source Media Access Control (MAC) address associated with the terminal; determining whether a matching entry associated with the terminal is found in a local verification table storing valid source IP addresses and valid source MAC addresses; determine that the matching entry associated with the terminal is not found in the local verification table; generating a request based on the source IP address and the source MAC address; transmitting the request to a dynamic host configuration protocol (DHCP) server; and determining whether the source IP address and the source MAC address associated with the terminal are valid based at least in part on a response from the DHCP server.

20 Claims, 9 Drawing Sheets

(56) References Cited

U.S. PATENT DOCUMENTS

| | | | |
|---|---|---|---|
| 2004/0153665 A1* | 8/2004 | Browne | H04L 63/104 |
| | | | 726/22 |
| 2005/0204062 A1* | 9/2005 | Sekine | H04L 12/2876 |
| | | | 709/245 |
| 2006/0002407 A1* | 1/2006 | Sakamoto | H04L 12/462 |
| | | | 370/402 |
| 2007/0002761 A1* | 1/2007 | Diamant | H04L 29/12009 |
| | | | 370/252 |
| 2007/0211729 A1* | 9/2007 | Yoshiba | H04L 45/60 |
| | | | 370/395.52 |
| 2008/0165778 A1 | 7/2008 | Ertemalp | |
| 2009/0006585 A1 | 1/2009 | Chen | |
| 2010/0325406 A1* | 12/2010 | Ukeda | G06F 9/4416 |
| | | | 713/2 |
| 2012/0084840 A1* | 4/2012 | Higuchi | H04L 49/354 |
| | | | 726/4 |
| 2013/0117427 A1* | 5/2013 | Amano | G06F 9/4416 |
| | | | 709/223 |
| 2013/0291117 A1 | 10/2013 | Thubert et al. | |
| 2014/0146816 A1 | 5/2014 | Taft et al. | |
| 2014/0244733 A1 | 8/2014 | Han et al. | |

OTHER PUBLICATIONS

Author Unknown, Wireless SAVI technology, machine translated via Google Translate, downloaded from: http://www.h3c.com.cn/Solution/Gov_Corporation/Education/Higher_Education/Technology_SoftDoc/201106/716073_30004_0.htm, Jun. 1, 2011.

Bi et al., A SAVI Solution for WLAN, downloaded from https://tools.ietf.org/html/draft-bi-savi-wlan-07, Feb. 5, 2015.

* cited by examiner

VERIFYING SOURCE ADDRESSES ASSOCIATED WITH A TERMINAL

CROSS REFERENCE TO OTHER APPLICATIONS

This application claims priority to People's Republic of China Patent Application No. 201510524597.4 entitled METHOD AND DEVICE USED TO VERIFY THE VALIDITY OF SOURCE ADDRESSES filed Aug. 24, 2015 which is incorporated herein by reference for all purposes.

FIELD OF THE INVENTION

The present application involves the field of internet technology. In particular, the present application involves techniques for verifying the validity of source addresses.

BACKGROUND OF THE INVENTION

In traditional network architecture, verifying the validity of terminal source addresses contained in messages received from a terminal can effectively prevent IP counterfeiting and spoofing. For example, counterfeiting and spoofing may occur when IP addresses included in messages sent by a terminal are manually configured. In a conventional verification process, the following principle is applied: the security checking of source media access control (MAC) addresses can be accomplished using the wireless security standard, 802.11i, and therefore, the security and validity of MAC addresses can therefore be ensured. A verifying entity (e.g., such as an access point (AP) or an access controller (AC)) establishes a source address validation improvement (SAVI) binding table entry by receiving the source addresses (e.g., the source Internet Protocol (IP) address and the source MAC address) of a terminal and saving a binding relationship between the source IP address and the source MAC address. For example, the SAVI binding table entry stores binding relationships between each terminal's source IP address and MAC address. As a result, the binding relationships stored in the SAVI binding table entry can be used to verify whether the source IP address included in the source addresses of a message that is received at a verifying entity is valid.

However, in the event that a verifying entity has no matching SAVI binding table entry for a terminal, it is unable to verify the validity of the terminal's source addresses. In this situation, conventionally, a transmission control protocol (TCP) channel is established among this verifying entity and other verifying entities to synchronize the different SAVI binding table entries stored among the different verifying entities.

For example, in a centralized wireless local area network (WLAN) architecture (e.g., that includes an AC and a fit AP), where APs serve as the verifying entities: when a terminal first goes online, the terminal launches the dynamic host configuration protocol (DHCP) by requesting an IP address from the DHCP server. AP1 intercepts the DHCP message and generates a corresponding SAVI binding table entry for that terminal and simultaneously submits the intercepted DHCP message to the AC. When the terminal roams across different ACs to AP2, AP2 searches locally and does not find a SAVI binding table entry that matches the terminal. After AP2 determines that it cannot find a SAVI binding table entry that matches the terminal, AP2 is caused to establish a channel with the AC in order to facilitate synchronization of SAVI binding table entries among different verifying entities.

In another example, in a centralized WLAN architecture, where the AC is the verifying entity: the DHCP message is intercepted on the AC and a SAVI binding table entry is generated. If the terminal roams among ACs, then a channel must also be established among the different ACs in order to synchronize the SAVI binding table entries among different verifying entities.

However, the conventional techniques used for synchronizing SAVI binding table entries among different verifying entities suffer from the need of having to establish channel(s) to perform the synchronization. Establishing the channel increases network complexity. Also, if the channel is interrupted, it becomes impossible to synchronize the SAVI table entries among the different verifying entities such that roaming verifying entities are unable to verify the validity of a terminal's source addresses. If a terminal is unable to be verified, then the terminal's messages are discarded, which impedes the terminal's ability to communicate normally.

BRIEF DESCRIPTION OF THE DRAWINGS

Various embodiments of the invention are disclosed in the following detailed description and the accompanying drawings.

Other features, objectives, and advantages of the present application will become more apparent through reading the detailed descriptions of the non-restrictive embodiments made with reference to the figures below.

DETAILED DESCRIPTION

Figure 1:
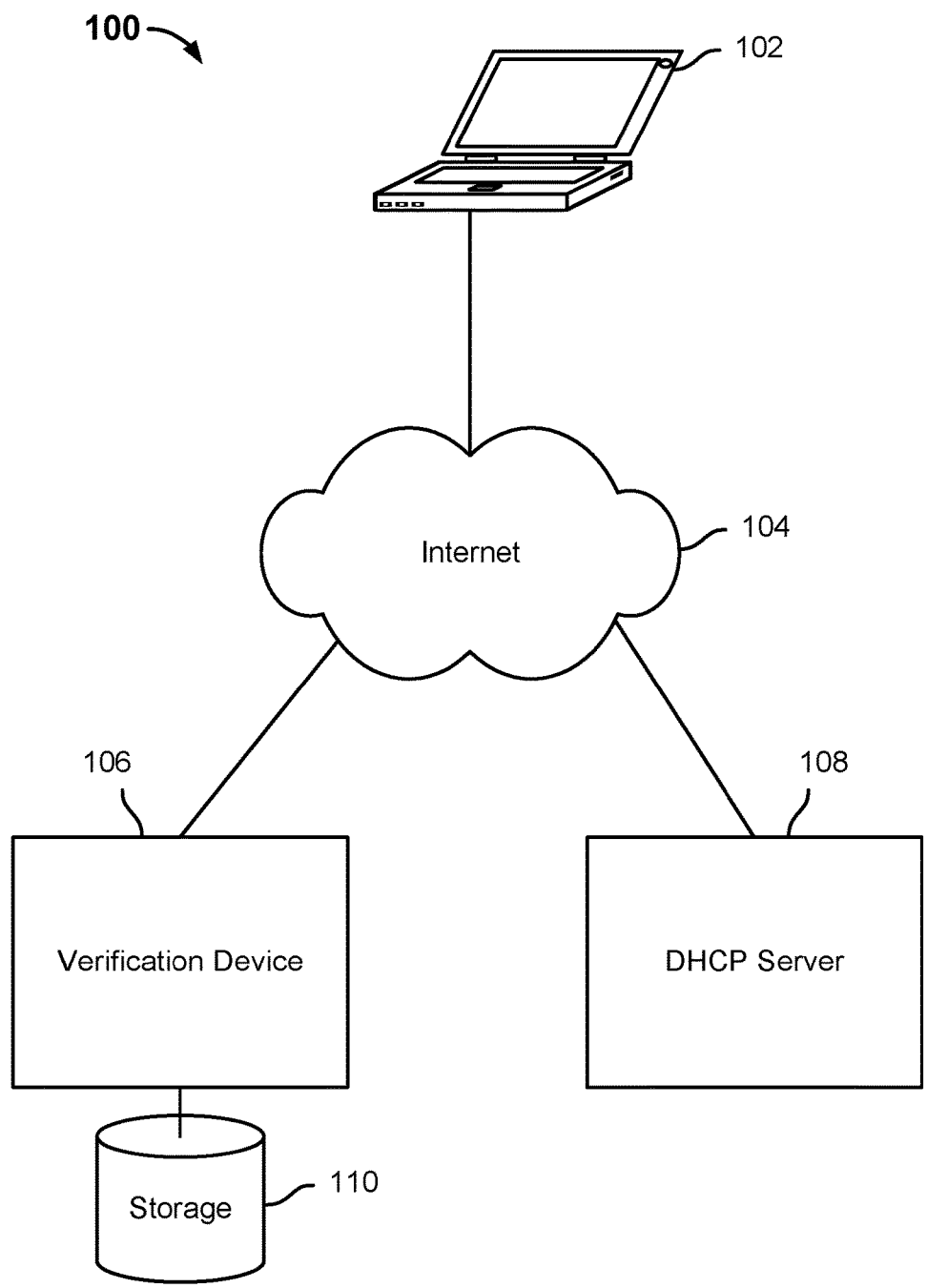
FIG. 1 is a diagram showing an embodiment of a system for verifying the validity of a terminal's source addresses.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, the computer equipment includes user equipment and network equipment. The user equipment includes, but is not limited to, computers, smartphones, and tablet devices. The network equipment includes, but is not limited to, individual network servers, server groups formed by multiple network servers, or a cloud-computing based cloud comprising of a large number of computers or network servers, for example. Cloud computing is one type of distributed computing where computing resources are shared through virtualization. The computer equipment may be run independently to realize the present application or it may access a network and realize the present application through interactive operations with other computer equipment in the network. Networks in which the computer equipment exists include, but are not limited to, the Internet, metropolitan area networks, local area networks, and VPN networks, for example. It should be noted that the user equipment, network equipment, and networks described herein are only examples.

The computer equipment includes user equipment and network equipment. The user equipment includes, but is not limited to, computers, smartphones, and tablet devices. The network equipment includes, but is not limited to, individual network servers, server groups formed by multiple network servers, or a cloud-computing based cloud consisting of a large number of computers or network servers, for example. Cloud computing is one type of distributed computing and comprises a super virtual computer formed by a set of loosely coupled computers. The computer equipment may be run independently to realize the present application or it may access a network and realize the present application through interactive operations with other computer equipment in the network. Networks in which the computer equipment exists include, but are not limited to, the Internet, metropolitan area networks, local area networks, and VPN networks, for example. It should be noted that the user equipment, network equipment, and networks described herein are only examples.

The methods (some of which are depicted by flowcharts) discussed below may be implemented through hardware, software, firmware, middleware, microcode, hardware description language, or any combination thereof. When the methods are implemented through software, firmware, middleware, or microcode, the program code or code segments used to implement the necessary tasks can be stored on a machine or computer-readable medium (e.g., a storage medium). One or more processors may implement the necessary tasks.

The specific structures and function details disclosed here are merely representative and are used for the purpose of describing exemplary embodiments of the present application. However, the present application may be concretely implemented through many alternative forms. Moreover, it should not be interpreted as being merely limited to the embodiments set forth here.

It should be understood that although the terms "first," "second," and so on are used to describe various units, these units should not be limited by these terms. These terms are used only in order to differentiate one unit from another. To give an example, so long as they do not depart from the scope of the exemplary embodiment, a first unit may be referred to as a second unit, and similarly a second unit may be referred to as a first unit. The term "and/or" used here includes any or all combinations of one or more listed related items.

The terms used here are merely intended to describe specific embodiments and are not intended to restrict the exemplary embodiments. Unless otherwise explicitly indicated by the context, the singular forms "a" or "an" used here are also intended to include the plural. It should also be understood that the terms "comprise" and/or "contain" as used here specify the existence of the stated features, integers, steps, operations, units and/or components and do not exclude the existence or the addition of one or more other features, integers, steps, operations, units, components, or combinations thereof.

It should also be noted that in some alternative implementations, the mentioned functions/actions may occur in a sequence other than that indicated in the drawings. For example, depending on the functions/actions involved, two drawings that are presented in succession may essentially be executed at the same time, or may sometimes be executed in reverse sequence.

Below is a more detailed description of the technical scheme of the present application in light of the drawings.

Embodiments of verifying source addresses associated with a terminal are described herein. A packet is received from a terminal. The packet comprises a source Internet Protocol (IP) address and a source Media Access Control (MAC) address associated with a terminal. It is determined whether a matching entry associated with the terminal is found in a local verification table storing valid source IP addresses and valid source MAC addresses. For example, the verification table comprises a source address validation improvement (SAVI) binding table. In the event that the matching entry associated with the terminal is not found in the local verification table, a request is generated based on the source IP address and the source MAC address. For example, the request comprises a DHCP request. The request is transmitted to a dynamic host configuration protocol (DHCP) server. It is determined whether the source IP address and the source MAC address associated with the terminal are valid based at least in part on a response from the DHCP server.

FIG. 1 is a diagram showing an embodiment of a system for verifying the validity of a terminal's source addresses. In the example, system 100 includes terminal 102, network 104, verification device 106, storage 110, and dynamic host configuration protocol (DHCP) server 108. Network 104 may comprise one or more high-speed data networks and/or telecommunications networks.

Terminal 102 is configured to generate a packet that is intended for a destination terminal (e.g., that is identified by at least a destination Internet Protocol (IP) address and/or a destination Media Access Control (MAC) address. For example, the packet may comprise a TCP packet that includes a source IP address in the sender IP address field of the TCP packet and a source MAC address in the sender MAC address field in the TCP packet. For example, terminal 102 comprises a laptop computer, a desktop computer, a tablet device, a smartphone, or any computing device. For example, the packet comprises a data packet. The packet comprises a source IP address and a source MAC address associated with the terminal. Terminal 102 is configured to send the packet to verification device 106.

Verification device 106 is configured to either restrict the communication that is sent from terminal 102 and/or protect the communication that is received at various other terminals that may receive communication from terminals such as terminal 102. Verification device 106 determines whether the source IP address and the source MAC address that are included in the received packet are valid and therefore, terminal 102 can be verified. For example, verification device 106 comprises an access point device or an access controller device. For example, an access point device can be a wireless router. The access point device can also be referred to as a fat access point (FAT AP) device. For example, an access controller device can be a wireless controller (e.g., a Cisco™ 5500 Series Wireless Controller) that is responsible for managing APs and forwarding of wired communication while the managed APs are responsible for managing wireless communication. In various embodiments, verification device 106 is configured to store verification table locally at storage 110. The verification table identifies source IP addresses and/or source MAC addresses that are valid and are associated with verified terminals. In various embodiments, the verification table comprises a source address validation improvement (SAVI) binding table. The SAVI binding table includes various entries, where each entry includes at least a valid source IP address and/or a valid source MAC address of a verified terminal and optionally, a lease time associated with the source IP address. To determine whether the source addresses (the source IP address and the source MAC address) that are included in the received packet are valid, at least one of the source addresses (e.g., the source IP message and the source MAC address) of the received packet are compared to source addresses of the entries stored in the local verification table. In the event that a matching entry can be found in the local verification table, the source addresses are then determined to be valid and the packet is forwarded to its destination terminal. Otherwise, in the event that a matching entry cannot be found in the local verification table, verification device 106 is then configured to simulate a transmission of a DHCP request from terminal 102 to DHCP server 108. In various embodiments, simulating a transmission of a DHCP request from terminal 102 to DHCP server 108 comprises verification device 106 generating a DHCP request that includes the source IP address and the source MAC address corresponding to terminal 102 (and that were included in the packet received from terminal 102) and sending the DHCP request to DHCP server 108. In various embodiments, the DHCP request generated by verification device 106 does not include the server identifier (DHCP server ID) option and a requested IP address option. If DHCP server 108 determines that it stores a record that includes at least the source IP address included in the DHCP request, then DHCP server 108 will send back an acknowledgment response (e.g., an ACK) to verification device 106. Otherwise, if DHCP server 108 determines that it does not store a record that includes at least the source IP address included in the DHCP request, then DHCP server 108 will send back a non-acknowledgment response (e.g., a NAK) or no response at all to verification device 106. In the event that verification device 106 receives an acknowledgment response from DHCP server 108, verification device 106 is configured to determine the source IP address and the source MAC address corresponding to terminal 102 to be valid and forward the packet to its destination terminal (or at least the next intermediate entity in between terminal 102 and the destination terminal). Furthermore, verification device 106 can optionally generate a new entry in the local verification table that includes the source IP address and the source MAC address corresponding to verified terminal 102 such that subsequent packets received from terminal 102 can be directly validated based on this entry. Otherwise, in the event that verification device 106 receives a non-acknowledgment response or no response at all from DHCP server 108, verification device 106 is configured to determine the source IP address and the source MAC address corresponding to terminal 102 to be invalid and prevent the packet from being forwarded to its destination terminal.

As will be described in further detail below, a terminal and its corresponding source addresses can be verified by using a verification device to simulate a transmission of a DHCP request from the terminal to a DHCP server. The response or lack thereof from the DHCP server to the verification device will indicate to the verification device whether the terminal and its source addresses can be verified and therefore, packets from that terminal can be forwarded to their destination terminals. Establishing (e.g., TCP) channels among different verification devices to synchronize their corresponding SAVI binding tables is no longer needed. One benefit of avoiding the establishment of TCP channels among different verification devices is that when a SAVI binding table entry that is added by one verification device, that new entry does not need to be synchronized among other verification devices. A second benefit of avoiding the establishment of TCP channels is that when a new verification device is used, the new verification device does not need to receive from/synchronize with existing verification devices for their SAVI binding table entries. Furthermore, simulating the transmission of the DHCP request on behalf of the terminal is also transparent to the terminal so normal communications sent from or to be received by the terminal are not disrupted.

Figure 2:
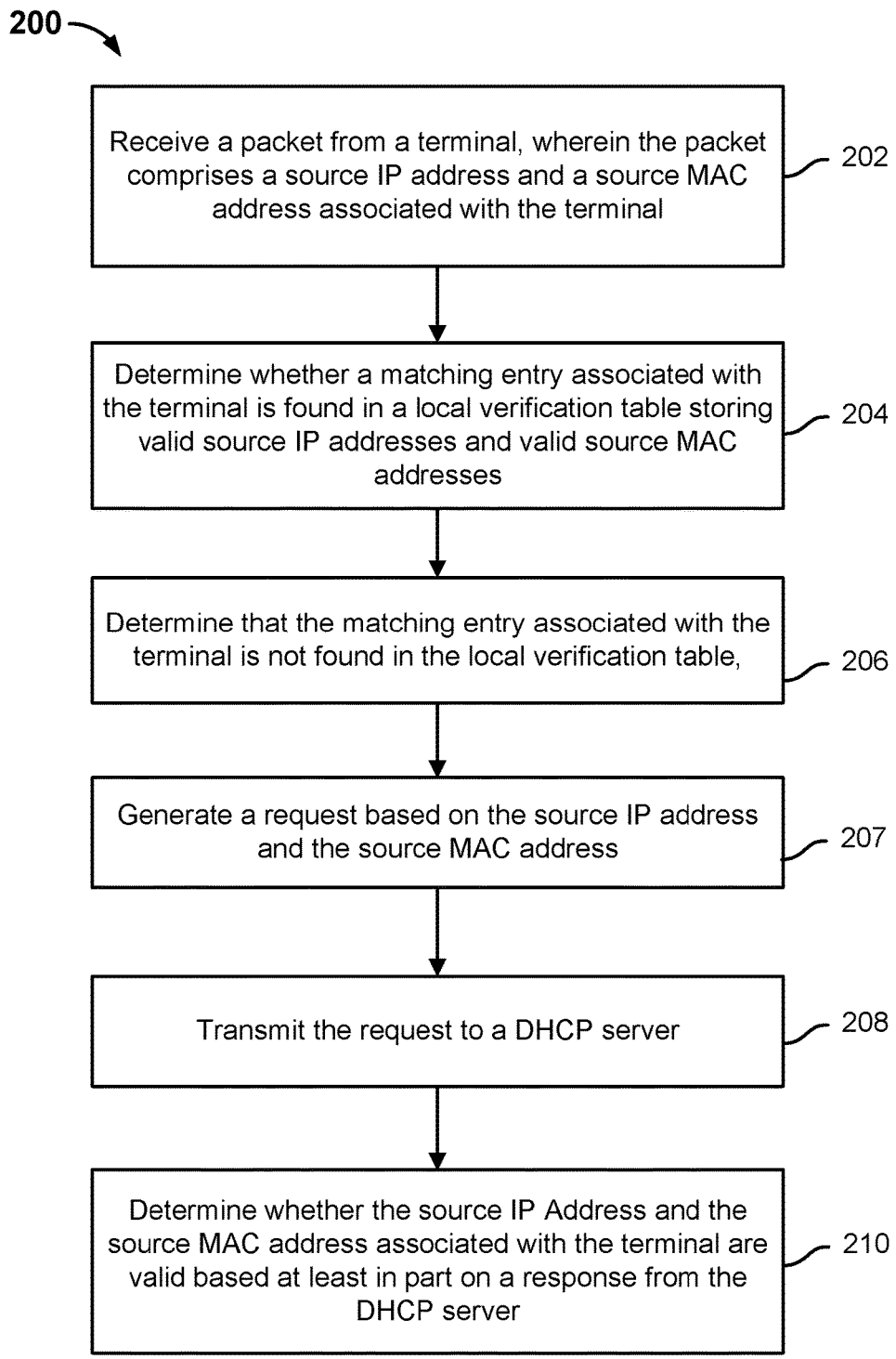
FIG. 2 is a flow diagram showing an embodiment of a process for verifying the validity of a terminal's source addresses.

FIG. 2 is a flow diagram showing an embodiment of a process for verifying the validity of a terminal's source addresses. In some embodiments, process 200 is performed at system 100 of FIG. 1. Specifically, in some embodiments, process 200 is performed at verification device 106 of system 100 of FIG. 1.

At 202, a packet is received from a terminal, wherein the packet comprises a source IP address and a source MAC address associated with the terminal.

In various embodiments, the packet sent from the terminal is part of a communication to be sent to a destination device/terminal (e.g., that is identified by a destination IP address and/or destination MAC address included in the packet).

At 204, it is determined whether a matching entry associated with the terminal is found in a local verification table.

In various embodiments, the "local" verification table comprises a SAVI binding table that is stored by the verification device that is performing process 200. In various embodiments, determining whether a matching entry associated with the terminal is found in the local SAVI binding table is used to determine whether the terminal can be verified and therefore, whether its packet should be forwarded to its destination. In various embodiments, determining whether a matching entry associated with the terminal is found in the local SAVI binding table comprises using the source IP address that is included in the packet as an index to search through the SAVI binding table. For example, using the source IP address that is included in the packet as an index to search through the SAVI binding table includes to compare the source IP address that is included in the packet against each source IP address that is stored in entries in the SAVI binding table.

In the event that the source IP address that is included in the packet can be found in the SAVI binding table, the source IP address and the source MAC address associated with the terminal are determined to be valid (i.e., verified) and the packet is forwarded to its destination location (e.g., that is identified by a destination IP address and/or destination MAC address included in the packet).

Otherwise, in the event that the source IP address that is included in the packet cannot be found in the SAVI binding table, the source IP address and the source MAC address associated with the terminal are not yet determined to be valid and additional verification is to be performed on the packet, as is described below.

In some embodiments, prior to determining the validity of the source IP address and the source MAC address of the packet, the received packet is stored in a buffer. For example, the buffer may comprise a temporary storage location in which the packet is stored prior to its source addresses having been found valid or invalid.

At 206, it is determined that the matching entry associated with the terminal is not found in the local verification table.

At 207, a request associated with the terminal is generated based on the source IP address and the source MAC address. In response to the determination that the matching entry associated with the terminal is not found in the local verification table, DHCP request is generated, as will be described in further detail below.

At 208, the request is transmitted to a DHCP server.

The following are two example scenarios in which a matching entry for the terminal may not be found in the local SAVI binding table:

1) The terminal has roamed from an area associated with an old verification device to another area associated with a new verification device in the same wireless local area network (e.g., in the same DHCP server environment, or in a double-live DHCP server environment having a primary-standby relationship), and the terminal has not executed the DHCP process to re-retrieve an IP address.

2) The verification device has been rebooted, which may have resulted in the loss of SAVI binding table entries that were saved before the reboot.

If a matching entry associated with the terminal cannot be found in the local SAVI binding table (i.e., the locally saved SAVI binding table does not store an entry that includes the source IP address that is included in the packet), the verification device generates a DHCP request on behalf of the terminal and sends the DHCP request to the DHCP server. In various embodiments, a DHCP request is generated by the verification server on behalf of the terminal by including the source IP address and the source MAC address that are included in the packet into a DHCP request, so as to "simulate" the request as being sent from the terminal when the DHCP request is actually generated and transmitted by the verification device.

For example, the source IP address value and the source MAC address value that are included in the packet are used as values in various fields in the DHCP request. The following is a list of example primary fields in a DHCP request and those fields that contain either the source IP address value or the source MAC address value that is included in the packet are noted below:

| | |
|---|---|
| Dst MAC | FF:FF:FF:FF:FF:FF |
| Src MAC | Source MAC address included in the packet |
| Type | 0x0800 |
| Src IP | Source IP address included in the packet |
| Dst IP | 255.255.255.255 |
| Protocol | 17 |
| Src Port | 68 |
| Dst Port | 67 |
| Message Type | 0x01 |
| Hardware Type | 0x01 |
| HLEN | 0x06 |
| HOPS | 0x00 |
| XID | Random value |
| SECS | 0x00 |
| FLAGS | 0x00 |
| CIADDR | Source IP address included in the packet |
| YIADDR | 0x00000000 |
| SIADDR | 0x00000000 |
| GIADDR | 0x00000000 |
| CHADDR | Source MAC address included in the packet |
| Option 53 | 0x35 01 03 |
| Option 61 | 0x37 0d 01 + Source MAC address included in the packet |
| Option 51 | 0x33 04 00 76 a7 00 |
| Option 255 | 0xff |

If the gateway program is configured with the DHCP relay mode, including "255.255.255.255" as the value of the "Dst IP" field, the DHCP request will cause the gateway to forward the request packet to the DHCP server. Even if the gateway program is not configured with the DHCP relay mode, which means that the DHCP server is in the same subnet, because the DHCP request is configured with "255.255.255.255" as the value of the "Dst IP" field, the DHCP request will also be forwarded to the DHCP server. As shown in the example above, the source IP address and the source MAC address that are included in the packet that was received from the terminal are included as the values of several fields of the DHCP request that is generated by the verification device. The fields in the example DHCP request that include the source IP address value from the packet are "Src IP" and "CIADDR." The fields in the example DHCP request that include the source MAC address value from the packet are "Src MAC," "CHADDR," and "Option 61." Additionally, it should be noted that the generated DHCP request does not contain a server identifier (DHCP server ID) option or a requested IP address option. This is because when the DHCP request includes the server ID or the requested IP address options, the DHCP server would assign a new IP address to the terminal and record it. The DHCP server stores information such as the correspondence relationship among an assigned IP address, a corresponding MAC address, and the term of validity of the assigned IP address. If the DHCP request does not contain the server identifier (DHCP server ID) option and a requested IP address option, then the DHCP server will not assign a new IP address to the terminal. Instead, the DHCP server will determine whether a record that corresponds to the value of the CIADDR field (the source IP address included in the packet) and the value of the CHADDR field (the source MAC address included in the packet) contained in the DHCP request is stored by the DHCP server. If an existing entry recorded at the DHCP server includes an IP address that matches the IP address of the CIADDR field, and this IP address is within the term of validity (e.g., the lease time) of that entry, this indicates that the IP address of the CIADDR field is valid and the DHCP server will return ACK (or some other acknowledgment response) to the verification device. Otherwise, if no entry recorded at the DHCP server includes an IP address that matches the IP address of the CIADDR field, this indicates that the IP address of the CIADDR field is not valid and the DHCP server will return NAK (or some other non-acknowledgment response) or will not transmit any response to the verification device. For example, the DHCP server can also send NAK or no response at all to the DHCP request if the DHCP server has no records related to the IP address of the CIADDR field of the DHCP request, if the correspondence relationship between the IP address of the CIADDR field of the DHCP request and the MAC address of the CHADDR field of the DHCP request does not match the correspondence relationship between the IP address and the MAC address in an existing entry recorded in the DHCP server, or the IP address of the CIADDR field of the DHCP request has passed its term of validity, and so on.

Therefore, by simulating a transmission by a terminal of a DHCP request to the DHCP server, the validity of the IP source address and the MAC source address that are included in the packet can be determined based on the response of the DHCP server.

Also, in contrast to conventional systems in which a TPC connection is required among verification devices to synchronize respective verification tables, DHCP-related communication as described in various embodiments is based on a connectionless protocol such as User Datagram Protocol (UDP), for example. As such, using a connectionless protocol, various embodiments as described herein can save on the resources that would otherwise be used to maintain a (e.g., TCP) connection.

At 210, it is determined whether the source IP address and the source MAC address associated with the terminal are valid based at least in part on a response from the DHCP server.

As described above, in the event that an acknowledgment response is received from the DHCP server in response to the DHCP request, the source IP address and the source MAC address from the packet and that were included in the DHCP request are then determined to be valid. However, in the event that a non-acknowledgment response is received or that no response is received from the DHCP server, the source IP address and the source MAC address from the packet and that were included in the DHCP request are then determined to be invalid.

In some embodiments, a timer can be started from the time that the DHCP request is transmitted to the DHCP server, and if an acknowledgment response returned by the DHCP server is received within a preset length of time, then the source IP address and the source MAC address of the terminal are determined to be valid. However, if no response is received within the preset length of time or if a non-acknowledgment response is received within the preset length of time, then the source IP address and the source MAC address of the terminal are considered to be invalid.

In some embodiments, because a transmission by a terminal of a DHCP request to the DHCP server has been simulated by the verification device (e.g., the simulated DHCP request is actually sent from the verification device to the DHCP server), in order to distinguish this simulated request from a DHCP request that is actually transmitted by the terminal, a simulation record can be established for the simulated transmitted request. The simulation record can be used to record the source IP address and the source MAC address (from the packet) that were included in the DHCP request and an identifier of the simulated DHCP request. Subsequently, upon receiving a response (e.g., an acknowledgment response) returned by the DHCP server, it is determined whether an identifier included in the response matches an identifier that is included in a simulation record and that therefore, the response pertains to a transmitted, simulated DHCP request. For example, the identifier of the DHCP request can be the DHCP transaction ID. If it is determined that the identifier (e.g., DHCP transaction ID) of the response matches an identifier (e.g., DHCP transaction ID) included in a simulation record, then the received response is determined to be a response to the simulated transmitted DHCP request. Upon a determination that a response to a simulated transmitted DHCP request has been received, the response is not transmitted to the terminal and the matching simulation record is deleted. If it is determined that the identifier of the response does not match any identifier included in the simulation records, then the received response is determined to not be a response to a simulated transmitted DHCP request and as such, the response is transmitted to the terminal (as it is assumed that the response was actually transmitted by the terminal to the DHCP server). Using this simulation record, it is possible to keep track of simulated DHCP requests for which responses have not yet been received and also distinguish simulated transmitted DHCP requests from DHCP requests that were actually transmitted by the terminal. The use of simulation records also allows the process of the verification device simulating transmissions of DHCP requests from terminals to be transparent to the terminals.

In various embodiments, upon receipt of an acknowledgment response returned by the DHCP server, in addition to determining that the source IP address and the source MAC address of the packet are valid, a new SAVI binding table entry that includes the source IP address and the source MAC address of the packet can be established and saved for the terminal that had transmitted the packet. By generating a SAVI binding table entry that includes the source IP address and the source MAC address corresponding to the terminal, subsequent packets received from the terminal (that will include the same source IP address and the source MAC address) can be verified directly based on this binding table entry.

In some embodiments, prior to determining the validity of the source IP address and the source MAC address of the packet, the packet is stored in a buffer. In the event that an acknowledgment response is received from a DHCP server in response to a simulated DHCP request that includes the source IP address and the source MAC address of the packet, the buffered packet can then be transmitted to its destination. However, if a non-acknowledgment response or no response is received from the DHCP server instead, then the buffered packet can be discarded, an authentication required message can be sent to the terminal, and/or the terminal can be caused to be disconnected from the current network connection with which the verification device is associated.

Figure 3:
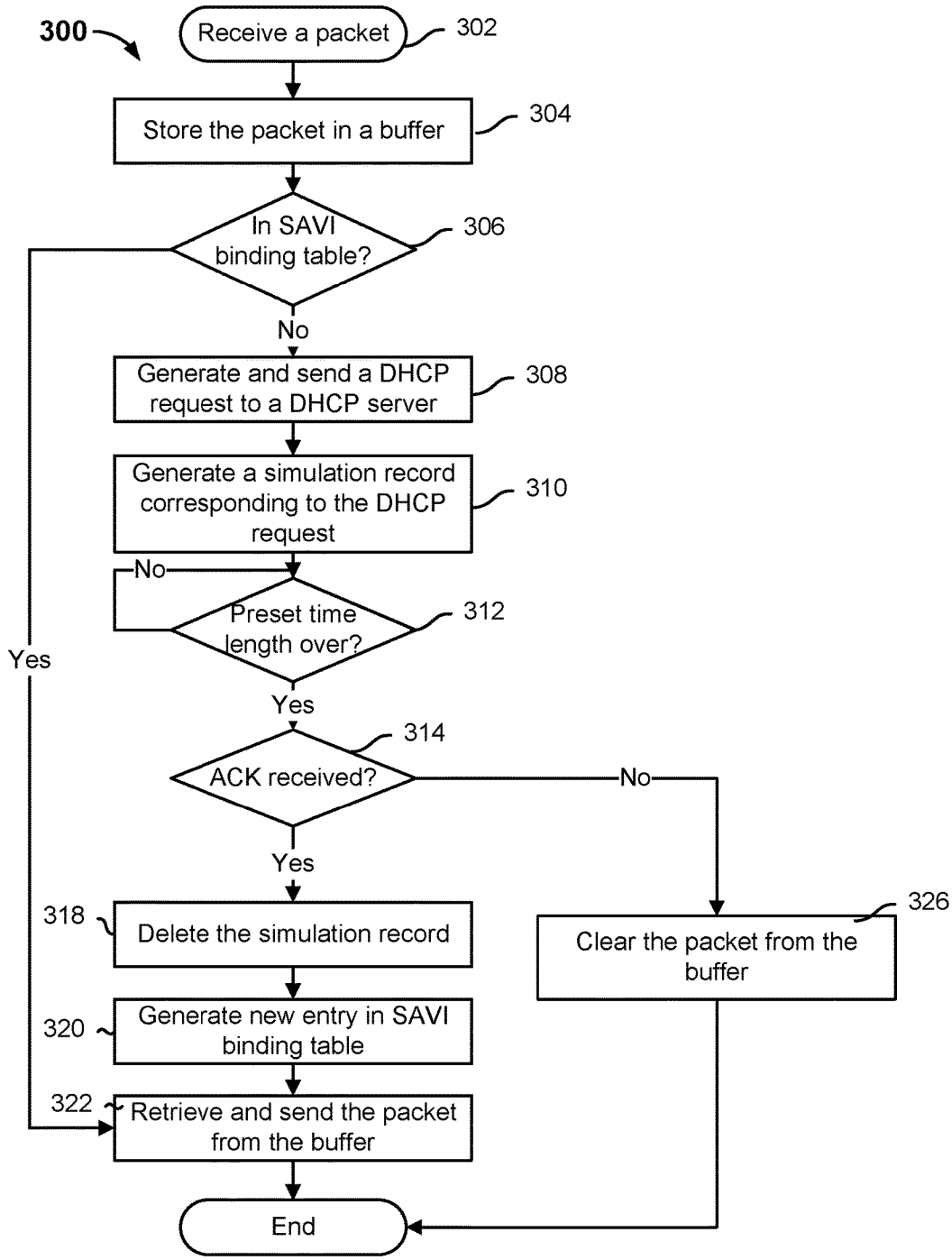
FIG. 3 is a flow diagram showing an example process for verifying the validity of a terminal's source addresses.

FIG. 3 is a flow diagram showing an example process for verifying the validity of a terminal's source addresses. In some embodiments, process 300 is performed at system 100 of FIG. 1. Specifically, in some embodiments, process 300 is performed at verification device 106 of system 100 of FIG. 1. In some embodiments, steps 202 through 210 of process 200 of FIG. 2 can be implemented by process 300.

At 302, a packet is received from a terminal, wherein the packet comprises a source IP address and a source MAC address associated with the terminal.

At 304, the packet is stored in a buffer. In some embodiments, storing the packet in a buffer refers to storing the packet in a local, temporary storage location. Whether the packet will be forwarded to its destination depends on whether the source IP address and the source MAC address associated with the terminal are determined to be valid, as described below.

At 306, it is determined whether a matching entry associated with the terminal is found in a local SAVI binding table. The local SAVI binding table is stored by the verification device that is performing process 300. In the event that the matching entry associated with the terminal is not found in the local SAVI binding table, control is transferred to 308. Otherwise, in the event that the matching entry associated with the terminal is found in the local SAVI binding table, control is transferred to 322, at which it is determined that the source IP address and the source MAC address associated with the terminal are valid and the packet is retrieved from the buffer and sent to a destination associated with the packet.

At 308, a DHCP request is generated and transmitted to a DHCP server, wherein the DHCP request includes the source IP address and the source MAC address. A transmission by a terminal of a DHCP request to the DHCP server is simulated by the verification device, which generates the DHCP request with the source IP address and the source MAC address from the packet and then sends the DHCP request to the DHCP server.

At 310, a simulation record corresponding to the DHCP request is generated and stored. The simulation record includes an identifier (e.g., a DHCP transaction ID) that is associated with the DHCP request. In various embodiments, the simulation record is stored at the verification device.

At 312, it is determined whether a preset length of time has elapsed since the transmission of the DHCP request. In some embodiments, the preset length of time is determined by an administrative user. In the event that the preset length of time has not elapsed, control is returned to 312. Otherwise, in the event that the preset length of time has elapsed, control is transferred to 314.

At 314, it is determined whether an acknowledgment response has been received from the DHCP server. For example, the acknowledgment response is an ACK. In some embodiments, the acknowledgment response from the DHCP server indicates that the DHCP server has stored a record that includes at least one of the source IP address and the source MAC address from the DHCP request. As such, the source IP address and the source MAC address from the DHCP request are determined to be valid. In the event that the acknowledgment response has been received from the DHCP server, control is returned to 318. Otherwise, in the event that the acknowledgment response has not been received from the DHCP server (e.g., either a non-acknowledgment response (e.g., a NAK) was received within the preset length of time, a non-acknowledgment response (e.g., a NAK) was received after the preset length of time, or no response at all was received within the preset length of time), control is transferred to 326. As such, the source IP address and the source MAC address from the DHCP request are determined to be invalid.

At 318, the simulation record corresponding to the DHCP request is deleted. An identifier (e.g., a DHCP transaction ID) associated with the acknowledgment response is compared to an identifier (e.g., a DHCP transaction ID) of the DHCP request that is stored in the simulation record. If there is a match, then the simulation record can be deleted as it has been confirmed that a response to the simulated DHCP request has been received. Furthermore, in the event that it has been confirmed that the response was to a simulated DHCP request (as opposed to an actual DHCP request that has been transmitted by the terminal), the response from the DHCP server is not transmitted to the terminal.

At 320, a new entry in the local SAVI binding table that includes the source IP address and the source MAC address associated with the terminal is generated.

At 322, the packet is retrieved from the buffer and sent to a destination associated with the packet. Once the source IP address and the source MAC address associated with the terminal are determined to be valid, it is assumed that the terminal that had sent the packet is verified and the packet is retrieved from the buffer and sent to a destination (e.g., that is identified by the packet).

At 326, the packet is cleared from the buffer. Because the source IP address and the source MAC address associated with the terminal are determined to be invalid, the terminal that had sent the packet is not verified and as such, the buffer is eventually cleared and the packet is consequently discarded.

In some embodiments, whether the packet is forwarded or discarded is logged.

Figure 4:
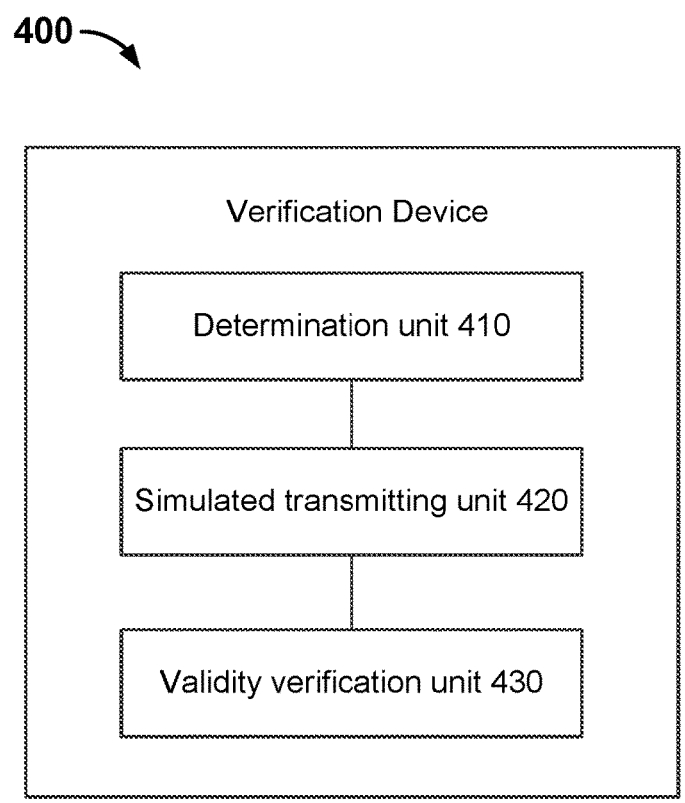
FIG. 4 is a diagram showing a first embodiment of a verification device.

FIG. 4 is a diagram showing a first embodiment of a verification device. As shown in the example of FIG. 4, verification device 400 comprises determination unit 410, simulated transmitting unit 420, and validity verification unit 430.

The units can be implemented as software components executing on one or more processors, as hardware such as programmable logic devices, and/or Application Specific Integrated Circuits designed elements can be embodied by a form of software products which can be stored in a non-volatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices.

Determination unit 410 is configured to receive a packet transmitted by a terminal. The packet includes the source IP address and the source MAC address of the terminal. Determination unit 410 is configured to determine whether a local verification (e.g., SAVI binding) table includes an entry that stores an IP address that matches the source IP address of the packet.

In the event that the local SAVI binding table does not include an entry that stores an IP address that matches the source IP address of the packet, simulated transmitting unit 420 is configured to simulate a transmission of a DHCP request from the terminal to a DHCP server. In various embodiments, simulated transmitting unit 420 is configured to simulate a transmission of a DHCP request from the terminal to a DHCP server by generating a DHCP request with the source IP address and the source MAC address from the packet in one or more fields of the request and transmitting the request to the DHCP server.

Validity verification unit 430 is configured to determine whether the source IP address and the source MAC address associated with the terminal are valid based on a response from the DHCP server.

Figure 5:
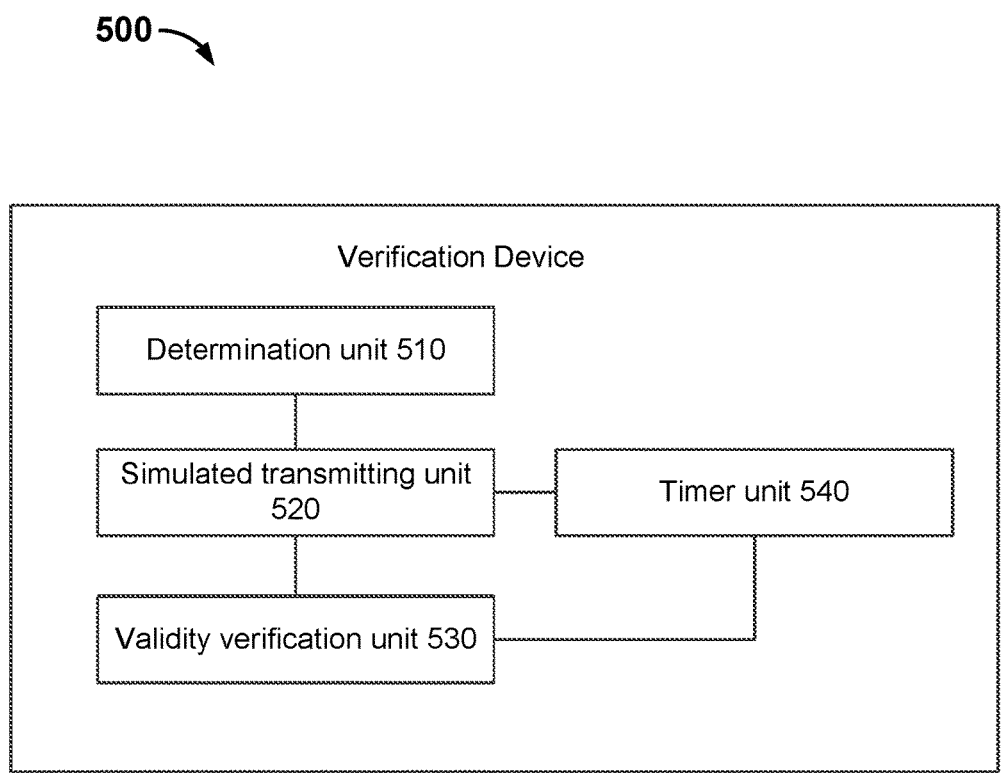
FIG. 5 is a diagram showing a second embodiment of a verification device.

FIG. 5 is a diagram showing a second embodiment of a verification device. As shown in the example of FIG. 5, verification device 500 comprises determination unit 510, simulated transmitting unit 520, validity verification unit 530, and timer unit 540.

Determination unit 510 can be implemented similarly to determination unit 410 of system 400 of FIG. 4. Simulated transmitting unit 520 can be implemented similarly to simulated transmitting unit 420 of system 400 of FIG. 4.

Timer unit 540 is configured to track the length of time elapsed since the DHCP request was transmitted to the DHCP server.

Validity verification unit 530 can be implemented similarly to validity verification unit 430 of system 400 of FIG. 4. Additionally, validity verification unit 530 is configured to determine that if an acknowledgment response is received from the DHCP server within a preset length of time, then the source IP address and the source MAC address that are included in the packet are valid. Otherwise, validity verification unit 530 is configured to determine that if a non-acknowledgment response or no response at all is received from the DHCP server within a preset length of time, then the source IP address and the source MAC address that are included in the packet are invalid.

Figure 6:
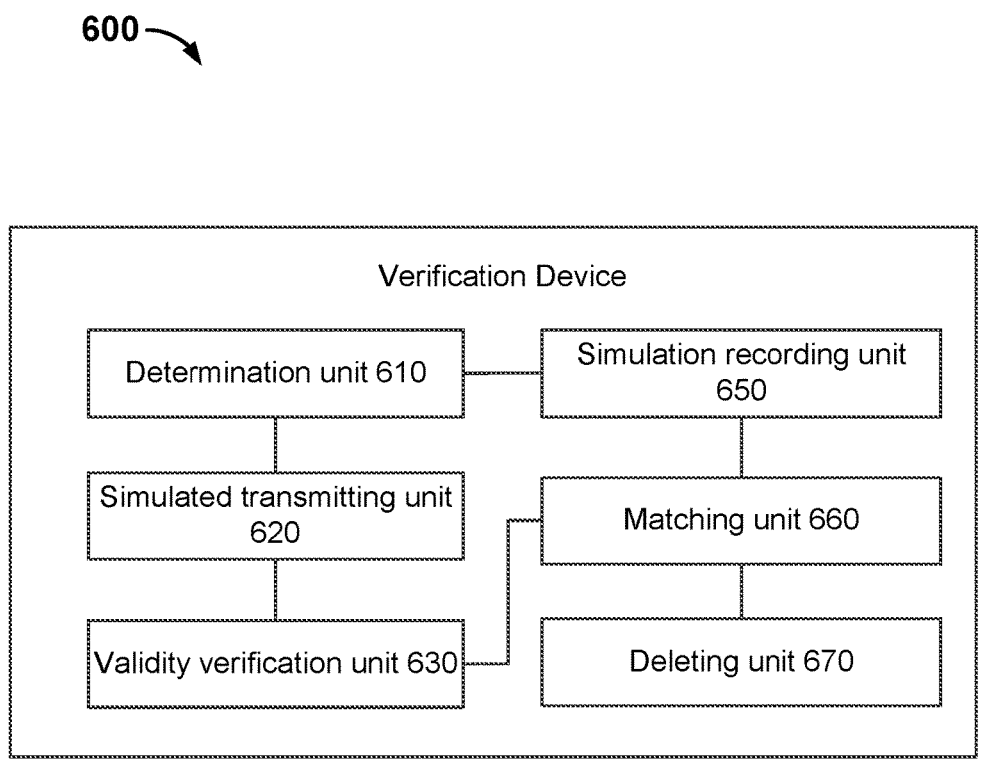
FIG. 6 is a diagram showing a third embodiment of a verification device.

FIG. 6 is a diagram showing a third embodiment of a verification device. As shown in the example of FIG. 6, verification device 600 comprises determination unit 610, simulated transmitting unit 620, validity verification unit 630, simulation recording unit 650, matching unit 660, and deleting unit 670.

Determination unit 610 can be implemented similarly to determination unit 410 of system 400 of FIG. 4. Simulated transmitting unit 620 can be implemented similarly to simulated transmitting unit 420 of system 400 of FIG. 4. Validity verification unit 630 can be implemented similarly to validity verification unit 430 of system 400 of FIG. 4.

Simulation recording unit 650 is configured to establish a simulation record for the DHCP request that was generated by simulated transmitting unit 620.

Matching unit 660 is configured to determine whether the acknowledgment response from the DHCP server is a response corresponding to the DHCP request by virtue of matching an established simulation record.

Deleting unit 670 is configured to delete the simulation record if it is determined that a response from the DHCP server matches that simulation record.

Figure 7:
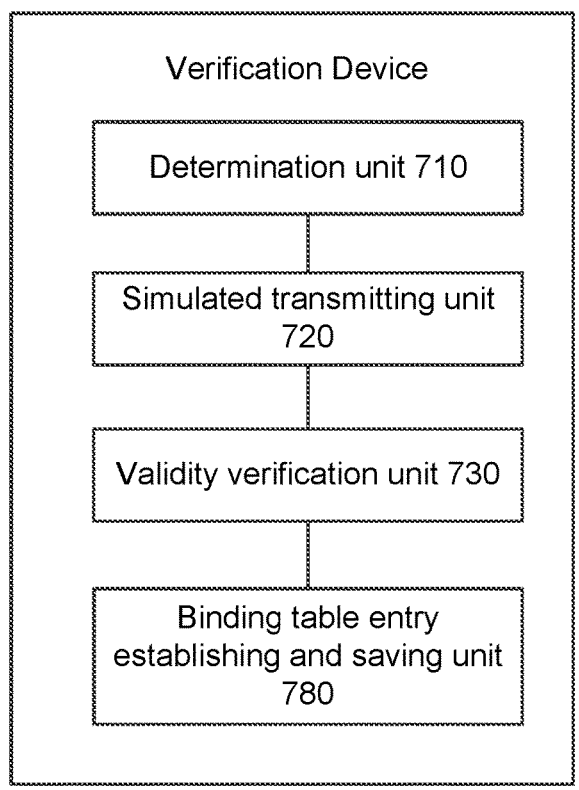
FIG. 7 is a diagram showing a fourth embodiment of a verification device.

FIG. 7 is a diagram showing a fourth embodiment of a verification device. As shown in the example of FIG. 7, verification device 700 comprises determination unit 710, simulated transmitting unit 720, validity verification unit 730, and binding table entry establishing and saving unit 780.

Determination unit 710 can be implemented similarly to determination unit 410 of system 400 of FIG. 4. Simulated transmitting unit 720 can be implemented similarly to simulated transmitting unit 420 of system 400 of FIG. 4. Validity verification unit 730 can be implemented similarly to validity verification unit 430 of system 400 of FIG. 4.

In response to receiving an acknowledgment response returned by the DHCP server that corresponds to a simulated DHCP request, binding table entry establishing and saving unit 780 is configured to establish and save a new entry for the terminal in a local SAVI binding table that includes the source IP address and the source MAC address associated with the terminal.

Figure 8:
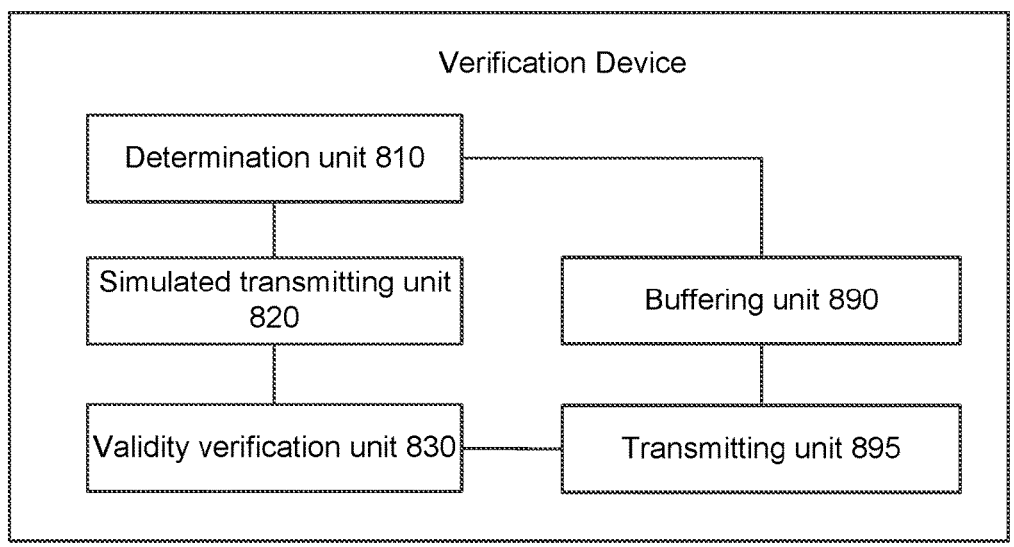
FIG. 8 is a diagram showing a fifth embodiment of a verification device.

FIG. 8 is a diagram showing a fifth embodiment of a verification device. As shown in the example of FIG. 8, verification device 800 comprises determination unit 810, simulated transmitting unit 820, validity verification unit 830, buffering unit 890, and transmitting unit 895.

Determination unit 810 can be implemented similarly to determination unit 410 of system 400 of FIG. 4. Simulated transmitting unit 820 can be implemented similarly to simulated transmitting unit 420 of system 400 of FIG. 4.

Buffering unit 890 is configured to buffer the packet.

In the event that an acknowledgment response is received from the DHCP server in response to the DHCP request, transmitting unit 895 is configured to retrieve the packet (whose source IP address and source MAC address are included in that DHCP request) from the buffer and transmit it to its destination (e.g., the destination IP address and/or destination MAC address that is included in the packet).

Validity verification unit 830 can be implemented similarly to validity verification unit 430 of system 400 of FIG. 4. Additionally, validity verification unit 830 is configured to determine that if an acknowledgment response is received from the DHCP server within a preset length of time, then the source IP address and the source MAC address that are included in the packet are valid. Otherwise, validity verification unit 830 is configured to determine that if a non-acknowledgment response or no response at all is received from the DHCP server within a preset length of time, then the source IP address and the source MAC address that are included in the packet are invalid and correspondingly, buffering unit 890 is configured to discard the packet of the terminal and transmit an authentication requirement message to the terminal.

As described above, the source IP address and the source MAC address associated with a terminal are validated based on using a verification device to simulate a transmission of a DHCP request from the terminal to the DHCP server. Various embodiments of performing verification on source addresses associated with a terminal do not require the establishment of an additional channel to synchronize SAVI binding table entries (e.g., that are managed by different verification devices). By avoiding the use of such channels, network configurations are simplified. The process of simulating the transmission of the DHCP request on behalf of the terminal is also transparent to the terminal so normal communications sent from or to be received by the terminal are not disrupted.

Figure 9:
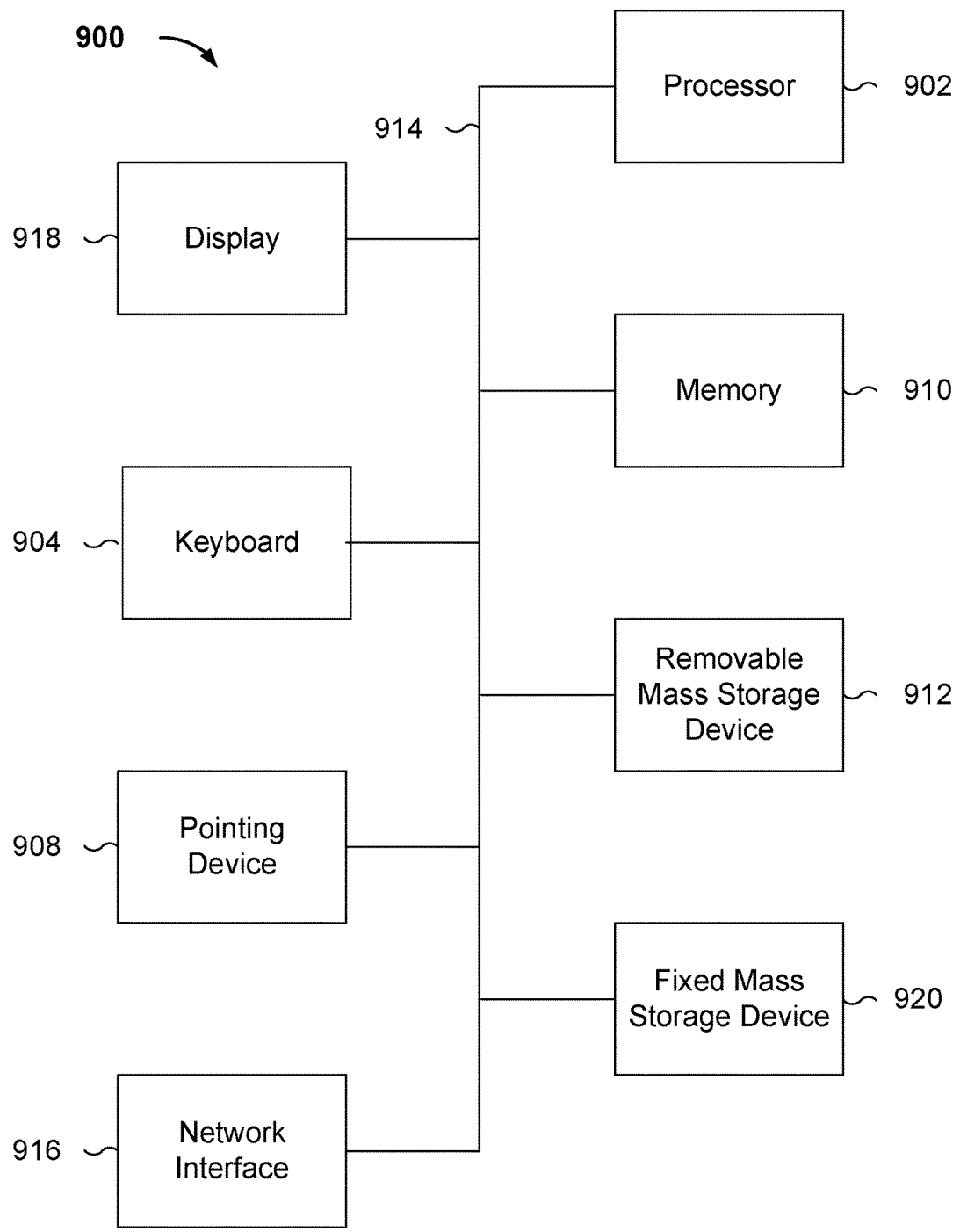
FIG. 9 is a functional diagram illustrating an embodiment of a programmed computer system for verifying the validity of a terminal's source addresses.

FIG. 9 is a functional diagram illustrating an embodiment of a programmed computer system for verifying the validity of a terminal's source addresses. As will be apparent, other computer system architectures and configurations can be used to verify the validity of a terminal's source addresses. Computer system 900, which includes various subsystems as described below, includes at least one microprocessor subsystem (also referred to as a processor or a central processing unit (CPU)) 902. For example, processor 902 can be implemented by a single-chip processor or by multiple processors. In some embodiments, processor 902 is a general purpose digital processor that controls the operation of the computer system 900. Using instructions retrieved from memory 910, the processor 902 controls the reception and manipulation of input data, and the output and display of data on output devices (e.g., display 918).

Processor 902 is coupled bi-directionally with memory 910, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 902. Also as is well known in the art, primary storage typically includes basic operating instructions, program code, data, and objects used by the processor 902 to perform its functions (e.g., programmed instructions). For example, memory 910 can include any suitable computer readable storage media, described below, depending on whether, for example, data access needs to be bi-directional or uni-directional. For example, processor 902 can also directly and very rapidly retrieve and store frequently needed data in a cache memory (not shown).

A removable mass storage device 912 provides additional data storage capacity for the computer system 900 and is coupled either bi-directionally (read/write) or uni-directionally (read only) to processor 902. For example, storage 912 can also include computer readable media such as magnetic tape, flash memory, PC-CARDS, portable mass storage devices, holographic storage devices, and other storage devices. A fixed mass storage 920 can also, for example, provide additional data storage capacity. The most common example of fixed mass storage 920 is a hard disk drive. Mass storages 912, 920 generally store additional programming instructions, data, and the like that typically are not in active use by the processor 902. It will be appreciated that the information retained within mass storages 912 and 920 can be incorporated, if needed, in standard fashion as part of memory 910 (e.g., RAM) as virtual memory.

In addition to providing processor 902 access to storage subsystems, bus 914 can also be used to provide access to other subsystems and devices. As shown, these can include a display 918, a network interface 916, a keyboard 904, and a pointing device 908, as well as an auxiliary input/output device interface, a sound card, speakers, and other subsystems as needed. For example, the pointing device 908 can be a mouse, stylus, track ball, or tablet, and is useful for interacting with a graphical user interface.

The network interface 916 allows processor 902 to be coupled to another computer, computer network, or telecommunications network using a network connection as shown. For example, through the network interface 916, the processor 902 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 902 can be used to connect the computer system 900 to an external network and transfer data according to standard protocols. For example, various process embodiments disclosed herein can be executed on processor 902, or can be performed across a network such as the Internet, intranet networks, or local area networks, in conjunction with a remote processor that shares a portion of the processing. Additional mass storage devices (not shown) can also be connected to processor 902 through network interface 916.

An auxiliary I/O device interface (not shown) can be used in conjunction with computer system 900. The auxiliary I/O device interface can include general and customized interfaces that allow the processor 902 to send and, more typically, receive data from other devices such as microphones, touch-sensitive displays, transducer card readers, tape readers, voice or handwriting recognizers, biometrics readers, cameras, portable mass storage devices, and other computers.

It should be noted that the present application can be implemented in software and/or a combination of software and hardware. For example, the present application can be realized using application-specific integrated circuits (ASICs), general purpose computers, or any other similar hardware equipment. In some embodiments, the software program of the present application may use execution by processors to implement the steps or functions described above. Similarly, the software program (including associated data structures) of the present application may be stored in computer-readable recording media such as RAM storage devices, magnetic or optical drives, floppy disks, or similar equipment. In addition, some of the steps or functions of the present application may be implemented through hardware, e.g., circuits that in combination with processors execute various steps or functions.

Additionally, part of the present application may be applied as computer program products, e.g., computer program commands which, when they are executed by a computer, via operation of the computer, can invoke or provide the method and/or technical scheme based on the present application. And the program commands that invoke the method of the present application may be stored in stationary or mobile recording media, and/or be transmitted through the data streams of broadcast or other signal carrier media, and/or be stored in the working memory of the computer equipment run based on the program commands. Here, some embodiments based on the present application comprise a device. This device comprises a memory used to store computer program commands and a processor used to execute program commands, wherein, when the computer program commands are executed by the processor, the device is triggered to run the methods and/or technical schemes of multiple embodiments based on the present application.

For persons skilled in the art, the present application is obviously not limited to the details of the exemplary embodiments described above. Moreover, the present application can be realized in other specific forms without deviating from the spirit or basic features of the present application. Therefore, regardless of how one views them, all of the embodiments should be regarded as exemplary and non-restrictive. The scope of the present application is limited by the claims and not by the description above. Therefore, all variations that fall within the meaning and scope of equivalents to the claims are to be included within the present application. In addition, obviously the word "comprise" or "include" does not exclude other units or steps, and the singular does not exclude the plural. Multiple units or devices described in the system claims may also be realized through software or hardware by one unit or device. The terms "first," "second," and so on are for naming purposes and do not indicate any specific sequence.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

receiving a packet from a terminal, wherein the packet comprises a source Internet Protocol (IP) address and a source Media Access Control (MAC) address associated with the terminal;

determining whether a matching entry associated with the terminal is found in a local verification table storing valid source IP addresses and valid source MAC addresses;

in response to the determining that the matching entry associated with the terminal is not found in the local verification table, generating a request based on the source IP address and the source MAC address;

generating a simulation record that includes an identifier associated with the request;

transmitting the request to a dynamic host configuration protocol (DHCP) server; and determining whether the source IP address and the source MAC address associated with the terminal are valid based at least in part on a response from the DHCP server, including:

determining whether the response from the DHCP server matches the identifier associated with the request; and in response to the response from the DHCP server matching the identifier associated with the request, deleting the simulation record and preventing the response from being transmitted to the terminal.

2. The method of claim 1, wherein the local verification table comprises a local source address validation (SAVI) binding table.

3. The method of claim 1, further comprising:

wherein in response to the source IP address and the source MAC address associated with the terminal being determined to be valid, transmitting the packet to a destination associated with the packet; and wherein in response to the source IP address and the source MAC address associated with the terminal being determined to be invalid, discarding the packet.

4. The method of claim 1, further comprising:

prior to the transmitting the request to the DHCP server, storing the packet in a buffer;

wherein in response to the source IP address and the source MAC address associated with the terminal being determined to be valid, retrieving the packet from the buffer and transmitting it to a destination associated with the packet; and wherein in response to the source IP address and the source MAC address associated with the terminal being determined to be invalid, discarding the packet.

5. The method of claim 1, further comprising:

wherein in response to the response from the DHCP server comprising a non-acknowledgment, determining that the source IP address and the source MAC address associated with the terminal are invalid; and wherein in response to the response from the DHCP server comprising an acknowledgment, determining that the source IP address and the source MAC address associated with the terminal are valid.

6. The method of claim 1, further comprising:

wherein in response to the response from the DHCP server comprising a non-acknowledgment:

determining that the source IP address and the source MAC address associated with the terminal are invalid; and preventing the packet from being sent to a destination associated with the packet; and wherein in response to the response from the DHCP server comprising an acknowledgment, determining that the source IP address and the source MAC address associated with the terminal are valid.

7. The method of claim 1, further comprising:

wherein in response to the response from the DHCP server comprising a non-acknowledgment, determining that the source IP address and the source MAC address associated with the terminal are invalid; and wherein in response to the response from the DHCP server comprising an acknowledgment:

determining that the source IP address and the source MAC address associated with the terminal are valid;

generating a new entry in the local verification table that includes the source IP address and the source MAC address associated with the terminal; and transmitting the packet to a destination associated with the packet.

8. The method of claim 1, wherein the request is generated without a server identifier (DHCP server ID) option or a requested IP address option.

9. A method, comprising:

receiving a packet from a terminal, wherein the packet comprises a source Internet Protocol (IP) address and a source Media Access Control (MAC) address associated with the terminal;

determining whether a matching entry associated with the terminal is found in a local verification table storing valid source IP addresses and valid source MAC addresses;

in response to the determining that the matching entry associated with the terminal is not found in the local verification table, generating a request based on the source IP address and the source MAC address;

transmitting the request to a dynamic host configuration protocol (DHCP) server; and determining whether the source IP address and the source MAC address associated with the terminal are valid based at least in part on a response from the DHCP server, including:

determining whether the response from the DHCP server is received within a preset length of time since transmitting the request to the DHCP server;

in response to the response from the DHCP server not being received within the preset length of time since transmitting the request to the DHCP server, determining that the source IP address and the source MAC address associated with the terminal are invalid; and in response to the response from the DHCP server being received within the preset length of time since transmitting the request to the DHCP server and that the response comprises an acknowledgment, determining that the source IP address and the source MAC address associated with the terminal are valid.

10. A computer program product, the computer program product being embodied in a non-transitory computer readable storage medium and comprising computer instructions for:

receiving a packet from a terminal, wherein the packet comprises a source Internet Protocol (IP) address and a source Media Access Control (MAC) address associated with the terminal;

determining whether a matching entry associated with the terminal is found in a local verification table storing valid source IP addresses and valid source MAC addresses;
in response to the determining that the matching entry associated with the terminal is not found in the local verification table, generating a request based on the source IP address and the source MAC address;
generating a simulation record that includes an identifier associated with the request;
transmitting the request to a dynamic host configuration protocol (DHCP) server; and
determining whether the source IP address and the source MAC address associated with the terminal are valid based at least in part on a response from the DHCP server, including:
  determining whether the response from the DHCP server matches the identifier associated with the request;
  in response to the response from the DHCP server matching the identifier associated with the request, deleting the simulation record and preventing the response from being transmitted to the terminal; and
  in response to the response from the DHCP server not matching the identifier associated with the request, transmitting the response to the terminal.

11. The computer program product of claim 10, further comprising:
  wherein in response to the source IP address and the source MAC address associated with the terminal being determined to be valid, transmitting the packet to a destination associated with the packet; and
  wherein in response to the source IP address and the source MAC address associated with the terminal being determined to be invalid, discarding the packet.

12. The computer program product of claim 10, further comprising:
  prior to the transmitting the request to the DHCP server, storing the packet in a buffer;
  wherein in response to the source IP address and the source MAC address associated with the terminal being determined to be valid, retrieving the packet from the buffer and transmitting it to a destination associated with the packet; and
  wherein in response to the source IP address and the source MAC address associated with the terminal being determined to be invalid, discarding the packet.

13. A system, comprising:
  a processor; and
  a memory coupled with the processor, wherein the memory is configured to provide the processor with instructions which when executed cause the processor to:
    receive a packet from a terminal, wherein the packet comprises a source Internet Protocol (IP) address and a source Media Access Control (MAC) address associated with the terminal;
    determine whether a matching entry associated with the terminal is found in a local verification table storing valid source IP addresses and valid source MAC addresses;
    in response to the determining that the matching entry associated with the terminal is not found in the local verification table, generate a request based on the source IP address and the source MAC address;
    generate a simulation record that includes an identifier associated with the request;
    transmit the request to a dynamic host configuration protocol (DHCP) server; and
    determine whether the source IP address and the source MAC address associated with the terminal are valid based at least in part on a response from the DHCP server, including:
      determine whether the response from the DHCP server matches the identifier associated with the request;
      in response to the response from the DHCP server matching the identifier associated with the request, delete the simulation record and preventing the response from being transmitted to the terminal; and
      in response to the response from the DHCP server not matching the identifier associated with the request, transmit the response to the terminal.

14. The method of claim 9, wherein, in response to the response from the DHCP server not matching the identifier associated with the request, transmitting the response to the terminal.

15. The method of claim 9, wherein in the response to the response from the DHCP server not being received within the preset length of time since transmitting the request to the DHCP server, preventing the packet from being sent to a destination associated with the packet.

16. The method of claim 9, wherein in response to the response from the DHCP server being received within the preset length of time since transmitting the request to the DHCP server and that the response comprises the acknowledgment:
  generating a new entry in the local verification table that includes the source IP address and the source MAC address associated with the terminal; and
  transmitting the packet to a destination associated with the packet.

17. A computer program product, the computer program product being embodied in a non-transitory computer readable storage medium and comprising computer instructions for:
  receiving a packet from a terminal, wherein the packet comprises a source Internet Protocol (IP) address and a source Media Access Control (MAC) address associated with the terminal;
  determining whether a matching entry associated with the terminal is found in a local verification table storing valid source IP addresses and valid source MAC addresses;
  in response to the determining that the matching entry associated with the terminal is not found in the local verification table, generating a request based on the source IP address and the source MAC address;
  transmitting the request to a dynamic host configuration protocol (DHCP) server; and
  determining whether the source IP address and the source MAC address associated with the terminal are valid based at least in part on a response from the DHCP server, including:
    determining whether the response from the DHCP server is received within a preset length of time since transmitting the request to the DHCP server;
    in response to the response from the DHCP server not being received within the preset length of time since transmitting the request to the DHCP server, determining that the source IP address and the source MAC address associated with the terminal are invalid; and
    in response to the response from the DHCP server being received within the preset length of time since transmitting the request to the DHCP server and that the response comprises an acknowledgment, determining that the source IP address and the source MAC address associated with the terminal are valid.

18. The computer program product of claim 17, wherein in response to the response from the DHCP server not being received within the preset length of time since transmitting the request to the DHCP server, preventing the packet from being sent to a destination associated with the packet.

19. The computer program product of claim 17, wherein in response to the response from the DHCP server being received within the preset length of time since transmitting the request to the DHCP server and that the response comprises the acknowledgment:
- generating a new entry in the local verification table that includes the source IP address and the source MAC address associated with the terminal; and
- transmitting the packet to a destination associated with the packet.

20. A system, comprising:
- a processor; and
- a memory coupled with the processor, wherein the memory is configured to provide the processor with instructions which when executed cause the processor to:
  - receive a packet from a terminal, wherein the packet comprises a source Internet Protocol (IP) address and a source Media Access Control (MAC) address associated with the terminal;
  - determine whether a matching entry associated with the terminal is found in a local verification table storing valid source IP addresses and valid source MAC addresses;
  - in response to the determining that the matching entry associated with the terminal is not found in the local verification table, generate a request based on the source IP address and the source MAC address;
  - transmit the request to a dynamic host configuration protocol (DHCP) server; and
  - determine whether the source IP address and the source MAC address associated with the terminal are valid based at least in part on a response from the DHCP server, including to:
    - determine whether the response from the DHCP server is received within a preset length of time since transmitting the request to the DHCP server;
    - in response to the response from the DHCP server not being received within the preset length of time since transmitting the request to the DHCP server, determine that the source IP address and the source MAC address associated with the terminal are invalid; and
    - in response to the response from the DHCP server being received within the preset length of time since transmitting the request to the DHCP server and that the response comprises an acknowledgment, determine that the source IP address and the source MAC address associated with the terminal are valid.

* * * * *